(12) United States Patent
Hollingsworth et al.

(10) Patent No.: US 7,237,810 B2
(45) Date of Patent: Jul. 3, 2007

(54) PLASTIC PIPE ADHESIVE JOINT

(76) Inventors: Elmont E. Hollingsworth, 12100 Wander La., Austin, TX (US) 78750; Joe T. Minarovic, 201 Logan Ranch Rd., Georgetown, TX (US) 78628

( * ) Notice: Subject to any disclaimer, the term of this patent is extended or adjusted under 35 U.S.C. 154(b) by 763 days.

(21) Appl. No.: 10/140,539

(22) Filed: May 7, 2002

(65) Prior Publication Data

US 2003/0155768 A1 Aug. 21, 2003

Related U.S. Application Data

(63) Continuation of application No. PCT/US01/28697, filed on Sep. 14, 2001.

(60) Provisional application No. 60/358,664, filed on Feb. 21, 2002, provisional application No. 60/233,080, filed on Sep. 15, 2000.

(51) Int. Cl.
*F16L 15/00* (2006.01)

(52) U.S. Cl. ...................... 285/390; 285/333

(58) Field of Classification Search ............... 285/21.1, 285/21.3, 285.1, 148.7, 291.2, 291.1, 333, 285/915, 355, 357, 390, 391, 40
See application file for complete search history.

(56) References Cited

U.S. PATENT DOCUMENTS

| | | | | |
|---|---|---|---|---|
| 1,562,675 A * | 11/1925 | Baker | ........................... | 285/40 |
| 1,645,032 A | 10/1927 | Wilson | | |
| 2,079,692 A * | 5/1937 | Lapointe | ..................... | 285/334 |
| 2,204,754 A * | 6/1940 | Frame | ........................ | 285/334 |
| 3,101,207 A * | 8/1963 | Pavel et al. | .................. | 285/355 |
| 3,822,902 A * | 7/1974 | Maurer et al. | .............. | 285/333 |
| 3,850,567 A * | 11/1974 | Heier | ....................... | 425/405.1 |
| 4,100,645 A * | 7/1978 | Meyers | ......................... | 16/2.4 |
| 4,359,096 A * | 11/1982 | Berger | ......................... | 169/44 |
| 4,522,431 A * | 6/1985 | Reimert | ...................... | 285/334 |
| 4,722,391 A * | 2/1988 | Brammer | .................... | 166/195 |
| 4,844,516 A * | 7/1989 | Baker | ......................... | 285/351 |
| 4,846,508 A * | 7/1989 | Pallini et al. | .......... | 285/148.19 |
| 4,900,066 A * | 2/1990 | Brammer et al. | ............. | 285/92 |

(Continued)

FOREIGN PATENT DOCUMENTS

WO WO-91/18733 12/1991

*Primary Examiner*—Aaron Dunwoody
(74) *Attorney, Agent, or Firm*—Jack V. Musgrove

(57) ABSTRACT

A method of joining two pipe ends, by forming male threads on an end of a first pipe with a steep taper angle, forming matching female threads on an end of a second pipe, and applying adhesive material to the threads before twisting the pipes to fully engage the male and female threads, thereby spreading the adhesive material across adjacent load-bearing surfaces of the threads. The threads have multiple start locations for thread engagement so that the pipe ends may be twisted to achieve full engagement in less than one full relative rotation. The male and female threads are formed with a squeeze angle between matching surfaces of the threads between 0.5 and 5.0 degrees. The finished joint provides immediate leak-tightness, and immediate tensile, compressive and torsional strength and does not protrude outside of the pipe profile. The technique may also be used to join pipes constructed of dissimilar materials, particularly by using a coupler that has the appropriate threading, and securing the coupler to a non-threaded pipe end using any convenient means, such as a mechanical fit, or fusion bonding.

1 Claim, 4 Drawing Sheets

U.S. PATENT DOCUMENTS

| | | | |
|---|---|---|---|
| 5,044,676 A | * | 9/1991 | Burton et al. ............... 285/334 |
| 5,048,197 A | * | 9/1991 | Anderson ................... 285/333 |
| 5,362,114 A | | 11/1994 | Levingston |
| 5,687,999 A | * | 11/1997 | Lancry et al. .............. 285/333 |
| 5,709,416 A | * | 1/1998 | Wood ......................... 285/330 |
| 6,059,883 A | * | 5/2000 | Tuttle ........................ 118/501 |
| 6,155,613 A | * | 12/2000 | Quadflieg et al. .......... 285/334 |
| 6,283,511 B1 | * | 9/2001 | Kamp ........................ 285/391 |
| 6,415,935 B1 | * | 7/2002 | Hins .......................... 285/333 |
| 6,543,816 B1 | * | 4/2003 | Noel .......................... 285/333 |
| 6,705,648 B1 | * | 3/2004 | Maruyama et al. ......... 285/334 |

* cited by examiner

PLASTIC PIPE ADHESIVE JOINT

CROSS-REFERENCE TO RELATED APPLICATIONS

This application claims priority to U.S. Provisional Application No. 60/358,664 filed on Feb. 21, 2002, and is a continuation of Patent Cooperation Treaty Application No. PCT/US01/28697 filed on Sep. 14, 2001 which claims priority to U.S. Provisional Application No. 60/233,080 filed on Sep. 15, 2000, both of which are hereby incorporated in their entirety.

BACKGROUND OF THE INVENTION

1. Technical Field

The present invention generally relates to methods and systems used to attach structural members, more specifically, to a joint for connecting conduits, and particularly to a joint that may be used to provide both mechanical attachment and a complete pressure seal for polymeric (plastic) pipe.

2. Description of Related Art

Many types of conduits are used to provide various utility services, such as telephone, cable, water, waste water, and natural gas. These conduits come in a variety of sizes, shapes and materials. One of the most common forms is a pipe having a circular cross-section, constructed of a polymeric (plastic) material, particularly acrylonitrile butadiene styrene, or polyvinyl chloride. These specific materials are typically used to construct pipes that are relatively rigid.

Conventional distribution systems for these various utilities use polymeric pipes of varying diameters to transport product, or convey signal lines, from suppliers to end users. There is a continual problem regarding leakage in such pipe systems due to inadequate joining of pipe sections. Leakage may be from the inside of the pipe to the outside (e.g., water or natural gas) resulting in the loss of product, or from the outside of the pipe to the inside (e.g., water penetration) which may deteriorate cabling that is protected by the conduit.

Various methods and systems have been devised to join the ends of plastic pipes. One approach is the use of adhesives (see, e.g., U.S. Pat. Nos. 3,784,235, 3,909,045 and 3,826,521). Joining pipe using adhesives, however, is generally unacceptable due to the difficult adherence characteristics of many polymers, which can result (after a period of time) in cracks in the cured adhesive or in separation of the adhesive from the pipe surface. The use of adhesive or glue (which may be toxic) also often involves a change in the inner diameter or outer diameter of one or both of the pipes, such as with a bell-and-pipe slip joint. Non-uniform pipe diameters can introduce difficulties when installing the pipe.

There is a further unmet need with regard to the joining of dissimilar plastic pipes, such as polyethylene (PE) and polyvinyl chloride (PVC). Present methods depend primarily on mechanical type couplings which are costly, use a variety of sealing methods such as "O" rings to achieve a satisfactory performance based joint. Solvent-based joining materials do not achieve any level of bond strength on polyethylene and other low-surface energy piping materials. Connecting polyethylene pipe to the existing underground network of PVC requires mechanical fittings. In the electrical distribution industry where polyethylene conduit must be joined to the flame retardant PVC sweep riser for service entrance a need exists for a smooth wall (Inside/Out) pipe joining method.

Another technique for fitting pipes together involves the use of electrofusion couplers (see, e.g., U.S. Pat. No. 4,486,650). These couplers overcome the adherence properties of the polyolefin compositions by being formed of the same thermoplastic material as the conduits to be joined. An electrical resistance heating element within the coupler raises the temperature of the material in both the coupler and the adjoining pipe, which then flows together. Upon cooling, the material from the two parts fuses together. As with other prior art techniques, however, electrofusion couplers often do not create a complete seal and the entire process must sometimes be repeated. Electrofusion couplers are also relatively expensive.

A more complicated technique for joining plastic pipe, using microwaves, is disclosed in U.S. Pat. No. 5,254,824. That system requires a composite bonding material comprised of a plurality of coated susceptor particles suspended in a matrix. As with the electrofusion couplers, the material of the matrix is adapted to fuse with the material of the pipe at high temperatures. The material is heated by energization of the susceptor particles via radiant microwave energy. This system is very complicated, however, as it requires a special microwave cavity and power supply, both of which can be very bulky. This technique also presents safety hazard to workers who may be exposed to microwave radiation.

A simpler approach to joining pipes is the use of pipe threading, i.e., where one pipe (with exterior male threads) screws into the end of the second pipe (with interior female threads). While threading is an acceptable way of joining certain kinds of pipe, particularly metal pipe, it is again much less useful in joining plastic pipe. Plastic threads do not have the strength of metal threads, and are more susceptible to stripping. Also, when a straight thread is used to connect two cylinders, a deep shoulder is required to accommodate each thread (male and female), which accordingly decreases the longitudinal strength of the cylinder wall. To avoid this problem, it is necessary to alter either the inner diameter or outer diameter of one of the pipes, which may lead to the difficulties mentioned above.

An alternative molded plastic cylinder thread design is disclosed in NASA Tech Brief 71-10336. That design uses a specific molded Spiral Buttress Thread with a 30 degree taper. With the Spiral Buttress design, no shoulder is required, removing the concerns regarding compromised wall thickness. The Spiral Buttress Thread is generally easy to start (that is, to align the male and female threads) and may, depending upon the initial relative axial orientation of the two pipe ends, be fully engaged in less than one relative rotation of the pipe ends, regardless of their diameter. This design, however, still does not provide a sufficient mechanical connection or a reliable high pressure seal. It would, therefore, be desirable to devise an improved pipe joint which both mechanically affixes two pipe ends and provides a stronger pressure seal. It would be further advantageous if the improved joint could be quickly completed without the need for special tools or equipment.

SUMMARY OF THE INVENTION

It is therefore one object of the present invention to provide an improved joint for connecting cylindrical polymeric pipes.

It is another object of the present invention to provide an improved joint that does not protrude outside of the pipe profile.

It is still another object of the present invention to provide an improved joint that has immediate strength sufficient to withstand handling and installation.

It is yet another object of the present invention to provide such a joint that imparts sufficient mechanical strength and sealing required for high pressure distribution of natural gas.

The foregoing objects are achieved in a method of joining two pipe ends, generally comprising the steps of forming a plurality of male threads on an end of a first pipe member, wherein the male threads have a steep taper angle, forming a plurality of female threads on an end of a second pipe member, wherein the female threads have the steep taper angle and are adapted to engage the male threads, applying adhesive material to a selected one of the male and female threads, aligning male threads with the female threads as the end of the first pipe member is brought into contact with the end of the second pipe member, then twisting the pipe members to fully engage the male and female threads, and thereby spread the adhesive material across adjacent load-bearing surfaces of the threads. Thereafter, the adhesive material is allowed to cure. The invention is particularly suited for use with polymeric pipe, and the threads can either be molded into the pipe ends, cut using a computer-controlled lathe or cut with other specialty thread cutting machines. The threads have multiple start locations for thread engagement. The pipe ends may be twisted to achieve full engagement in less than one full relative rotation of the pipes. The freshly assembled joint thereby formed provides immediate low pressure leak-tightness and immediate tensile, compressive and torsional strength. The curing of the adhesive results in improved strength and sealing.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
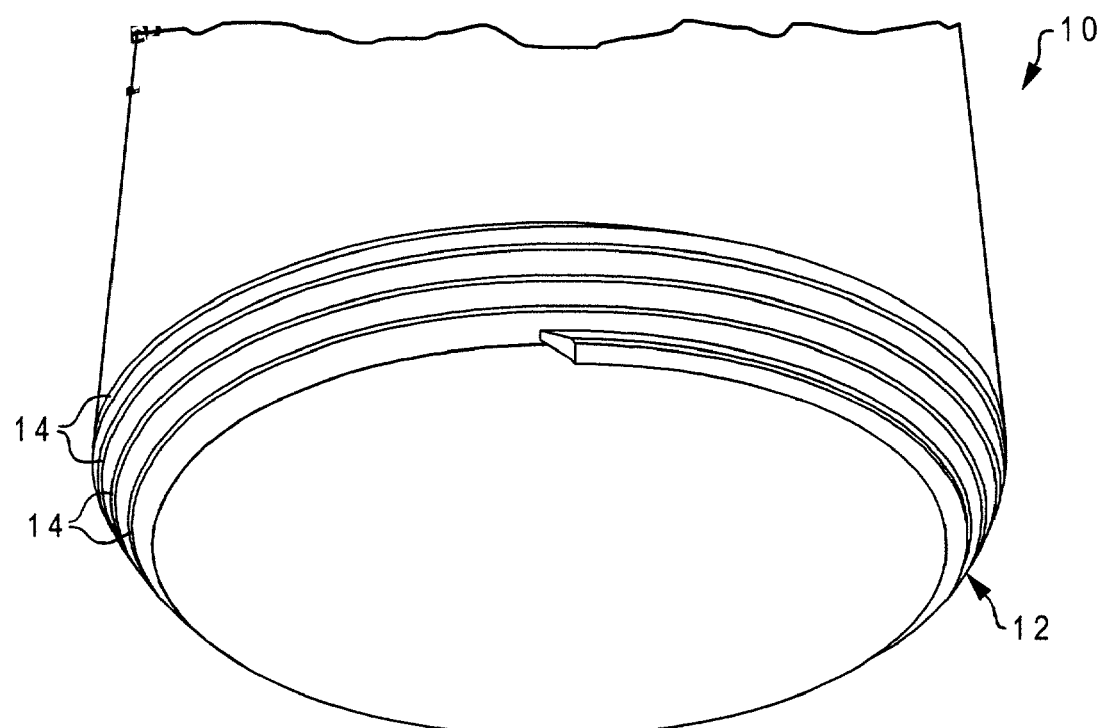
FIG. 1 is a perspective view of one embodiment of a male pipe end constructed in accordance with the present invention.

With reference now to the figures, and in particular with reference to FIG. 1, there is depicted one embodiment 10 of a pipe constructed in accordance with the present invention. Pipe 10 is cylindrical with a generally circular cross-section, and has an end 12 provided with male threading 14. The hollowed interior of the pipe may be used to convey a particular fluid product, or may accommodate other conduits e.g., telecommunications lines.

Pipe 10 may be constructed of any durable material, preferably a rigid polymer such as polyvinyl chloride (PVC) or acrylonitrile butadiene styrene (ABS). The specific dimensions of pipe 10 may vary considerably, depending upon the application. For example, the outer diameter of pipe 10 might be as small as half an inch, or as large as six feet. The length of pipe 10 may similarly vary, from a couple of feet to a hundred feet or more.

Threading 14 is tapered across the complete thickness of pipe wall 16. The taper angle is relatively steep, preferably in the range of 20°–60°. In the illustrative embodiment shown in the figures, the taper is approximately 35°. With this taper, the threads are not capable of cross-threading. When assembled with a corresponding female threaded pipe end, the joint is self-centering and self-rounding.

Figure 2:
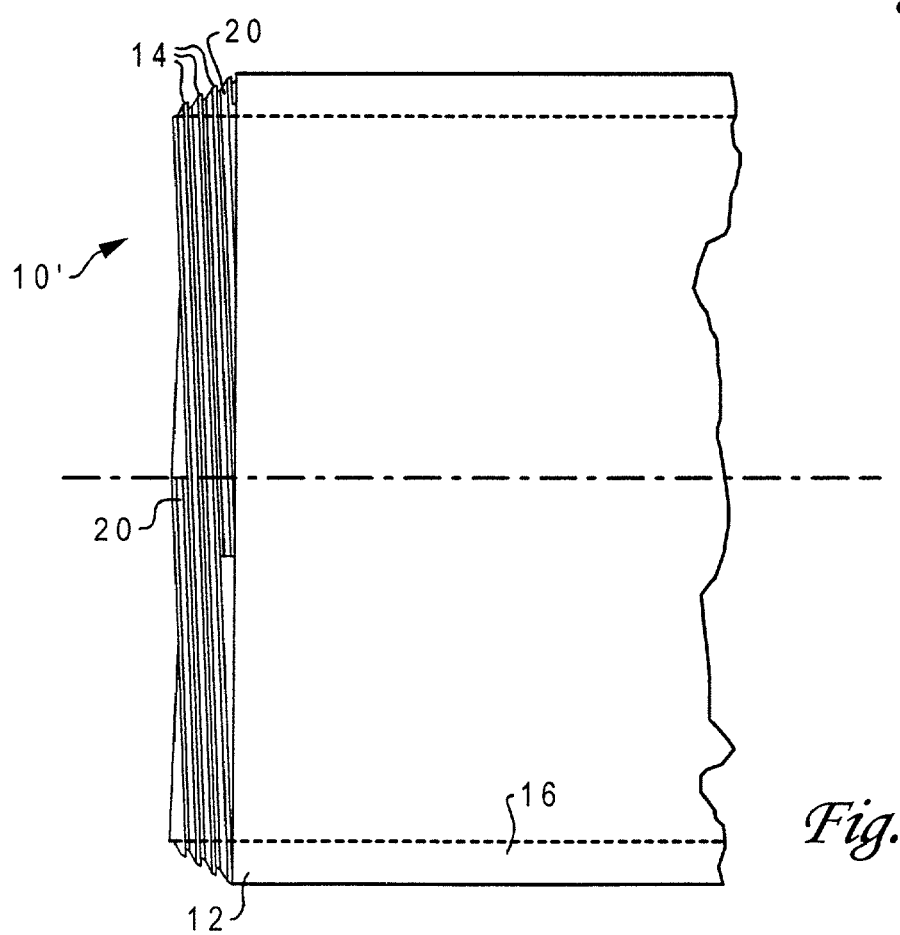
FIG. 2 is an elevational view of the male pipe end of FIG. 1.
Figure 3:
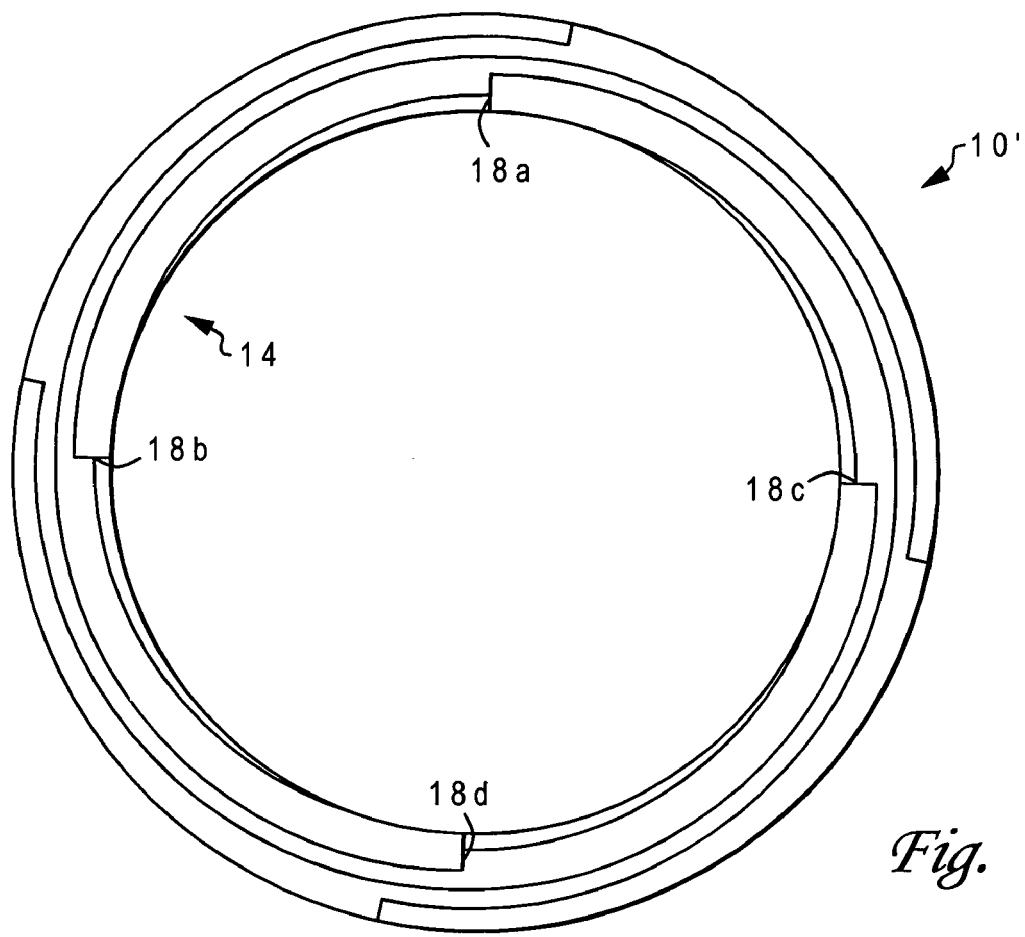
FIG. 3 is a plan (axial) view of the male pipe end of FIG. 1.

While the embodiment of pipe 10 shown in FIG. 1 has a single thread set, there may also be multiple sets of threads, i.e., multiple start or lead-in locations to begin engagement with corresponding female threads, as illustrated with pipe 10' in FIGS. 2 and 3. In the depicted embodiment, there are four start locations 18a–18d. Threading 14 may thereby become fully engaged with corresponding female threading with less than one relative rotation (<360°) of pipe 10'. The multiple thread sets may also be seen in FIG. 2, where a single thread 20 is shaded to show its starting and ending locations. In this particular embodiment, full thread engagement may be accomplished with as little as a 30° turn and a maximum of a 120° turn. The 90° difference is the rotation space between the starts of engagement.

The present invention uses a thread poorly adapted for a ordinary thread joint in plastic to form an adhesive joint of superior quality. The torque required to loosen the thread joint is a small percentage of the tightening torque. The rotation required to loosen the thread joint is very small. The result of over tightening the joint is compressing the end of the pipe with the male thread and expanding the end of the pipe with the female thread.

The foregoing adhesive joint design presents several advantages when compared to previous joint designs. Adding adhesive to the threads before tightening them produces a superior joint that enhances to ability of the adhesive make and seal a good joint. This tapered threading provides a large surface area compared to the cross-section of the pipe itself. The joint is completed with less than one twist of the pipe, such that the adhesive does not have sufficient time or distance to seize, gall or be scraped off before the joint makes up. The threads need only be lightly tightened to make a satisfactory joint. The male and female threads radially approach each other faster than 0.008 inches per inch of circumferential travel. The squeeze angle or Arctangent of the rate of radial approach of the surfaces is larger than a half of a degree. This angle is a function of the taper angle of the threads, thread pitch, the diameter of the pipe, and the number of thread starts. The invention contemplates a squeeze angle in the range of 0.5° to 5°. This small angle facilitates uniform application of adhesive across the load-bearing surfaces of the threads. The threads act as a self-clamping joint while the adhesive sets. The threads provide sufficient strength to the joint so that it may be handled and installed before the adhesive sets. The lack of extension beyond the pipe profile decreases the size of hole, trench or tunnel required for installation and does not impede flow of product through the pipe or restrict or the conduits that can be installed within it.

Different types of adhesive may be used with the joint. The adhesive is preferably non-toxic, strong and quick setting. It need not be gap-filling or crack filling. Solvent glues such as "airplane" glue, and solvent glues that dissolve part of the pipe and then cure to permanently make a single, integral material joint between the pipes being joined may be used, but are relatively slow in their curing times. Although days may be required for complete solvent evaporation, the initial mechanical strength of the joint allows nearly immediate installation and low pressure testing to confirm basic leak-tightness. This advantage of the invention compensates for the drying time of these glues.

Chemical reacting glue such as epoxy, urethane or cyanoacrylate may also be used with this joint. In these cases, the initial mechanical strength may not be the most important feature but the self-clamping of the joint and the thin glue line contribute to a high-strength and convenient joint.

The adhesive is preferably placed completely around the periphery of the male thread with a swab, sponge or paint brush. The mating thread design nominally calls for a zero gap between the threads. Tightening the threads forces the gap closed. This squeezes out excess adhesive from the joint. The flow of excess adhesive out of the joint assists and assures the even distribution of adhesive throughout the joint. The small gap of the joint design minimizes the adhesive required and maximizes the strength of the adhesive bond between the two surfaces to be bonded.

The minimizing of the amount of adhesive used minimizes cost, minimizes exposure of adhesive to the person applying the adhesive, minimizes clean up and usually lowers the setup time of the adhesive. The minimizing the amount of adhesive gap to be filled increases bond strengths and maximizes chemical and corrosion resistance of the joint.

Figure 4:
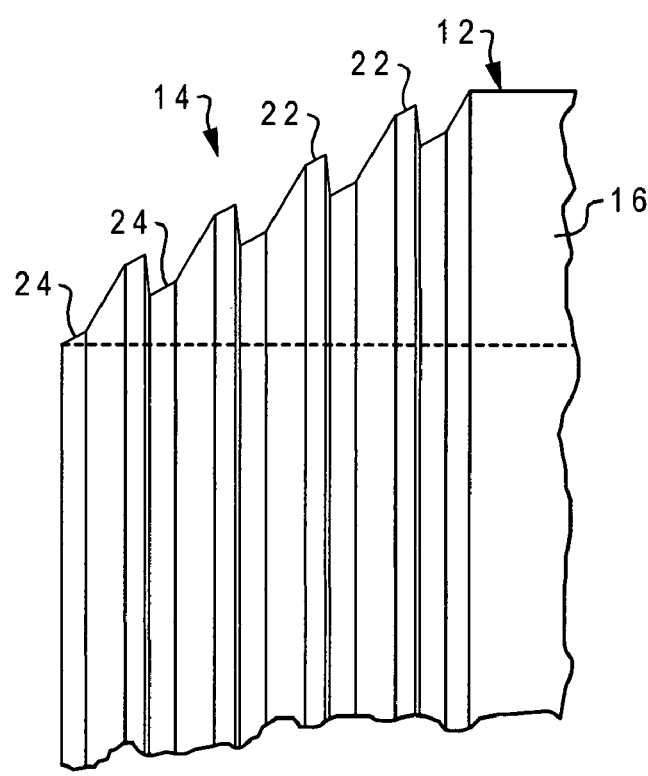
FIG. 4 is a detail of FIG. 2 depicting the tapered design of the threads of the male pipe end.

An exemplary thread profile is shown in detail in FIG. 4. The threads have a stepped appearance (frusto-triangular) in which the tips or edges 22 are sheared at the included angle. In this embodiment, the effective included angle between thread flanks is approximately 60°. A complementary geometry is formed at the inner apex of a thread by landing portions 24 whose surfaces are generally parallel with a taper direction of the threading (or radiused). This geometry reduces any incomplete filling of the adhesive material in the interstices between adjacent threads. The nominal pitch (distance between adjacent threads) is picked to result in three to six full threads in the wall thickness. The foregoing thread specifications may be achieved using molding techniques (e.g., injection molding), or by cutting with a computer-controlled lathe or milling machine, or with a cam-controlled, specially-designed threading machine.

The invention includes many alternative embodiments. For example, pipe 10 may be provided with male threading at one end, and female threading at the other end. In this manner, a large number of such pipes may easily be joined from end to end. The joint does not require any kind of coupling, and can be applied to other types of pipe members besides straight, such as reducers, adapters, sex changers and caps. Other alternative embodiments include variations in thread profiles, thread pitch, number of starts, taper angles, and left-handed threads.

A second pipe having corresponding female threading is engaged with pipe 10. The joint formed thereby is further secured by the thin adhesive layer. The joined piping can be immediately handled and installed after make up. The joint maintains the same inner and outer diameters of the terminal portions of the piping.

Figure 5:
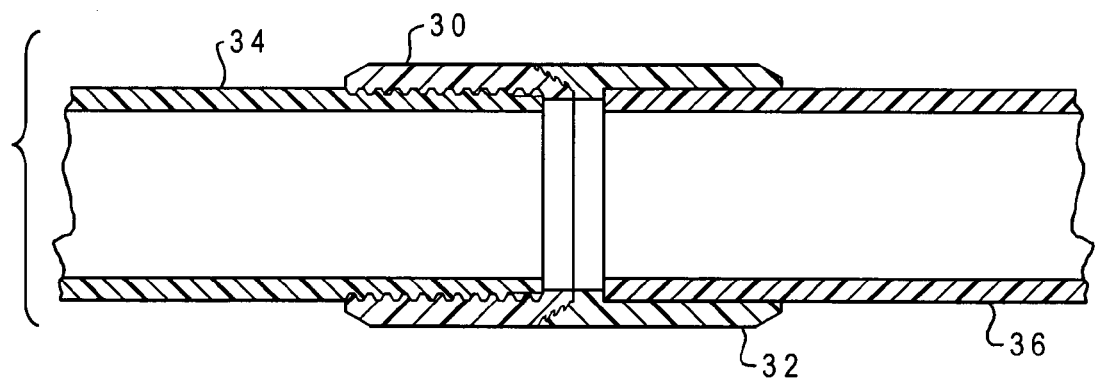
FIG. 5 is a sectional view showing a completed pipe joint in accordance with another implementation of the present invention, utilizing threaded couplings.

Another implementation of the present invention is illustrated in FIG. 5. Two short pieces of end-threaded pipe 30, 32 are used to join two pipe ends 34, 36. The material of each piece or coupling 30, 32 is selected for joining properties of the end of the pipe 34, 36 to be joined. For example, if pipe 34 is made of polyethylene then corresponding coupling 30 might be constructed of a suitable engineering polymer including Delrin, or glass reinforced nylon, and if pipe 36 is made of polyvinyl chloride (PVC) then coupling 32 might also be constructed of PVC. Each of these couplings is secured to the corresponding pipe end by any convenient means, including an adhesive (such as PVC cement) or mechanical means (such as a threaded or swedge fit). Joining of the pipes is thus accomplished by the end-threading of the coupling pieces, and a suitable bonding adhesive like epoxy, acrylic, or other non-solvent based adhesive is applied to the thread area. Solvent-based adhesives may be used, but they preferably would not utilize a solvent that might dissolve the material of the pipe ends or couplings.

Figure 6:
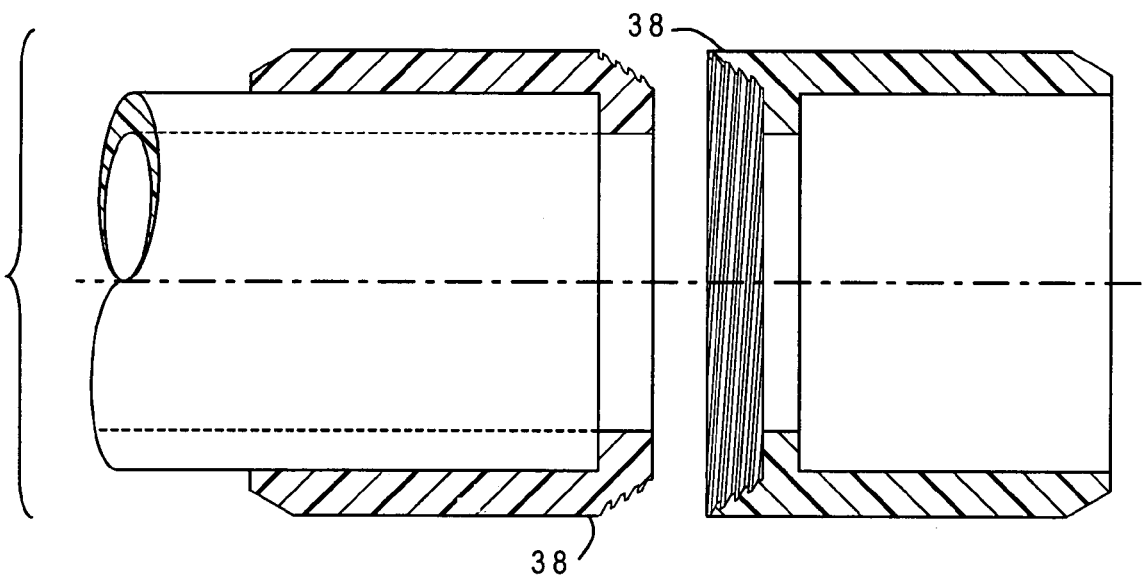
FIG. 6 is a sectional view of an alternative coupler design which may be used with the present invention to further strengthen the joint by providing increased wall thickness.

A further variation in the use of couplings according to the present invention is shown in FIG. 6. In this variation, the threaded ends 38 of the couplers have an inwardly-extending annular portion such that the effective thickness of the coupling wall is approximately doubled. An adhesive joint with this increased wall thickness leads to improved strength. For example, whereas the couplings of FIG. 5 might provide around 50% of the original strength (of the pipe material), the use of a 2× wall thickness results in 100% of the original strength.

Figure 7:
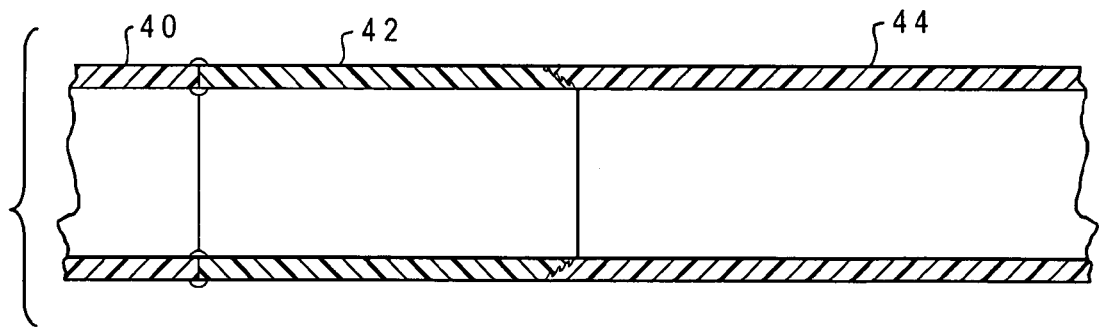
FIG. 7 is a sectional view depicting a completed pipe joint in accordance with a further implementation of the present invention, utilizing a fusion-joined end-piece.

FIG. 7 depicts another application of the present invention for joining pipes of dissimilar material (such as PVC and PE). In an existing installation where one pipe (e.g., constructed of PE) has no threading, a coupler having appropriate threading is attached to the unthreaded pipe. In this example, a fusion (heat) bonding process is used to secure one end of the PE pipe 40 to an end of the PE coupling 42. A PVC pipe 44 can then be attached to PE coupling 42 using the threading methods as previously described.

Figure 8:
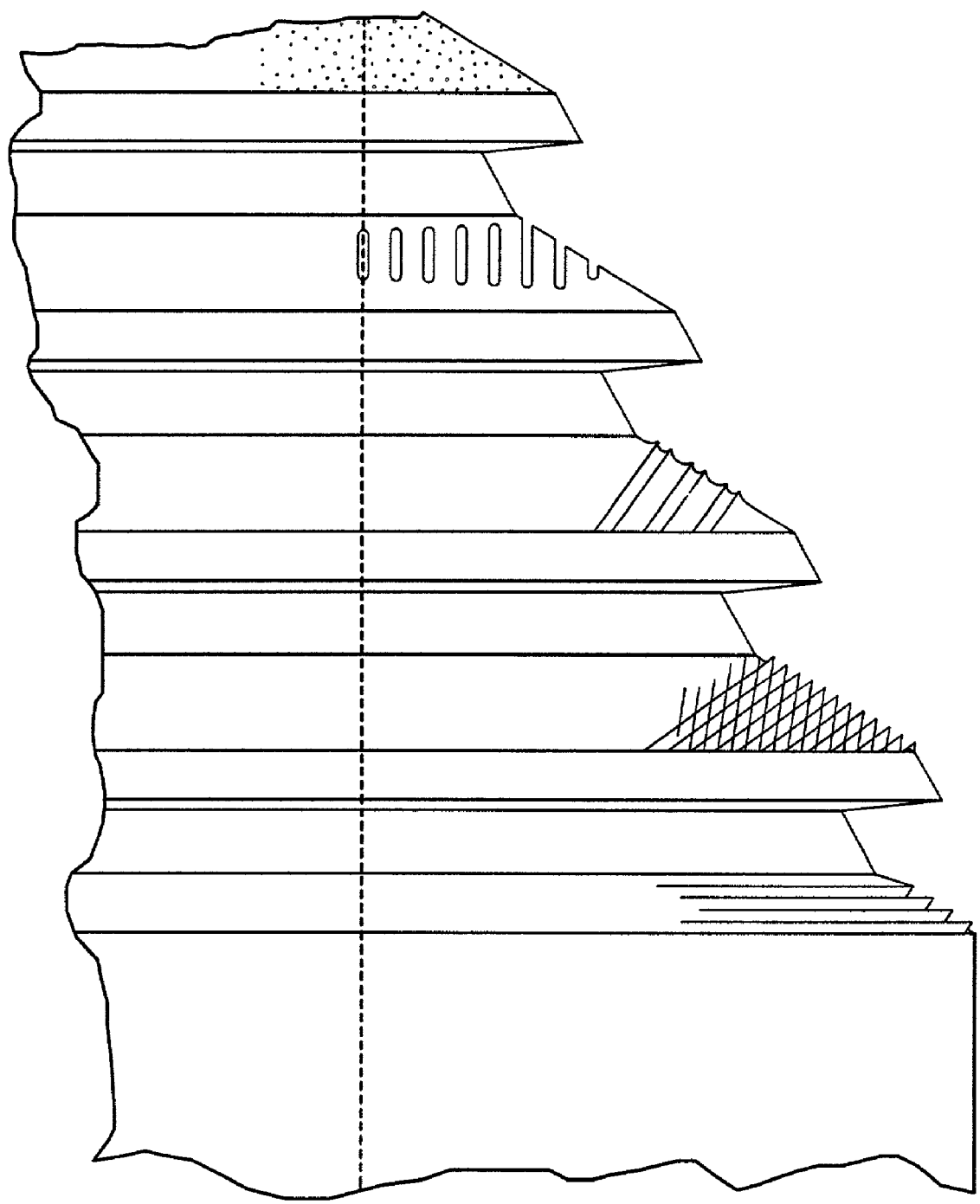
FIG. 8 is a detail view illustrating a surface pattern on the threads that enhances the adhesive bonding.

The bond provided by the adhesive located between adjacent male and female threads may be further enhanced by applying relief details to the threading (on either the male or female threads, or both), as shown in FIG. 8. This approach may be used to join either similar material or dissimilar material pipes together. The thread milling leaves a surface pattern on the threads that increases adhesive bonding.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while application of the present invention has been described with reference to utility conduits, the invention may be used in other applications, such as forming piping for pneumatic delivery systems. It is therefore contemplated that such modifications can be made without departing from the spirit or scope of the present invention as defined in the appended claims.

The invention claimed is:

1. A pipe joint comprising:
a first pipe member having a circular cross-section with inner and outer diameters at an end, said end of said first pipe member having a plurality of male threads with a steep taper angle in the range of 20°–60° and a spiral buttress profile;
a second pipe member having a circular cross-section with the same respective inner and outer diameters at an end, said end of said second pipe member having a plurality of female threads with the same steep taper angle and the same spiral buttress profile in engagement with said male threads, wherein matching surfaces of said male and female threads have a squeeze angle as the threads are brought into engagement of between 0.5 degrees and 5.0 degrees, said male and female threads have a pitch such as to result in 3 to 6 full threads across a thickness of a wall of each pipe member, said male and female threads have a surface relief pattern formed thereon, and said male and female threads have multiple start locations for thread engagement whereby said male and female threads may become fully engaged in less than one relative rotation; and
a cured adhesive material spread across adjacent load-bearing surfaces of said male and female threads which bonds said male and female threads.

* * * * *